US012658091B2

(12) United States Patent
Ninan

(10) Patent No.: US 12,658,091 B2
(45) Date of Patent: Jun. 16, 2026

(54) QUANTUM DOTS AND PHOTOLUMINESCENT COLOR FILTER

(71) Applicant: DOLBY LABORATORIES LICENSING CORPORATION, San Francisco, CA (US)

(72) Inventor: Ajit Ninan, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 18/832,307

(22) PCT Filed: Jan. 31, 2023

(86) PCT No.: PCT/US2023/012021
§ 371 (c)(1),
(2) Date: Jul. 23, 2024

(87) PCT Pub. No.: WO2023/150126
PCT Pub. Date: Aug. 10, 2023

(65) Prior Publication Data

US 2025/0118236 A1 Apr. 10, 2025

Related U.S. Application Data

(60) Provisional application No. 63/305,632, filed on Feb. 1, 2022.

(30) Foreign Application Priority Data

Feb. 10, 2022 (EP) .................................... 22156126

(51) Int. Cl.
*G09G 3/20* (2006.01)
*G09G 3/36* (2006.01)

(52) U.S. Cl.
CPC ......... *G09G 3/2003* (2013.01); *G09G 3/3607* (2013.01); *G09G 2300/0452* (2013.01);
(Continued)

(58) Field of Classification Search
CPC ............... G09G 3/2003; G09G 3/3607; G09G 2300/0452; G09G 2320/0242; G09G 2320/0666; G09G 2340/06; G09G 5/02
See application file for complete search history.

(56) References Cited

U.S. PATENT DOCUMENTS 7,649,594 B2 1/2010 Kim
8,362,684 B2 1/2013 Bawendi
(Continued)

OTHER PUBLICATIONS

U.S. Appl. No. 61/486,160, filed May 13, 2011, 96 pages.
(Continued)

*Primary Examiner* — Christopher E Leiby

(57) ABSTRACT

Image data is received for rendering an image on an image display to a viewer (402). The image data specifies a pixel value of the image for a pixel of the image display to render. The pixel value for the pixel includes multiple component pixel values corresponding to multiple color components of a color space. A color gamut locational value of the pixel value is computed based on two or more component pixel values in the multiple component pixel values of the pixel value specified for the pixel (404). The color gamut locational value is used to determine whether bandwidth broadening is to be applied to image rendering light produced by the pixel of the image display to render the pixel value (406). The image rendering light is directed to the viewer.

18 Claims, 10 Drawing Sheets

(52) U.S. Cl.
CPC ............... *G09G 2320/0242* (2013.01); *G09G 2320/0666* (2013.01)

(56) References Cited

U.S. PATENT DOCUMENTS

| | | | | |
|---|---|---|---|---|
| 8,508,830 | B1 | 8/2013 | Wang | |
| 8,773,453 | B2 | 7/2014 | Ninan | |
| 9,464,769 | B2 | 10/2016 | Ninan | |
| 9,564,078 | B2 | 2/2017 | Ninan | |
| 9,644,804 | B2 | 5/2017 | Ninan | |
| 9,726,887 | B2 | 8/2017 | Fleck | |
| 9,746,157 | B2 | 8/2017 | Ninan | |
| 9,810,942 | B2 | 11/2017 | You | |
| 10,884,560 | B2 | 1/2021 | Pan | |
| 2010/0053992 | A1* | 3/2010 | Krijn | G02B 6/0068 362/609 |
| 2010/0091032 | A1 | 4/2010 | Ueki et al. | |
| 2014/0293392 | A1 | 10/2014 | Ninan | |
| 2015/0348501 | A1* | 12/2015 | Mitsui | G09G 5/02 345/88 |
| 2016/0328090 | A1 | 11/2016 | Klinghult | |
| 2018/0082658 | A1 | 3/2018 | Atkins et al. | |
| 2020/0027421 | A1 | 1/2020 | Sun | |
| 2020/0105171 | A1* | 4/2020 | Greenebaum | G06T 5/80 |
| 2020/0411490 | A1 | 12/2020 | Ahmed | |
| 2020/0411717 | A1 | 12/2020 | Keates | |
| 2021/0057493 | A1* | 2/2021 | Liu | H10K 59/35 |
| 2021/0097929 | A1* | 4/2021 | Li | G09G 3/2007 |
| 2021/0097943 | A1 | 4/2021 | Wyatt | |
| 2021/0256931 | A1 | 8/2021 | Davis | |

OTHER PUBLICATIONS

U.S. Appl. No. 61/486,166, filed May 13, 2011, 58 pages.
U.S. Appl. No. 61/486,171, filed May 13, 2011, 53 pages.
Zhaojun, Liu et al., Micro-light-emitting Diodes with Quantum Dots in Display Technology, Dec. 2020, 23 pages.

* cited by examiner 200-1

200-2

200-3

200-4

200-1

230-1

230-2

230-3

230-4

230-5

QUANTUM DOTS AND PHOTOLUMINESCENT COLOR FILTER

CROSS-REFERENCE TO RELATED APPLICATIONS

This application is the U.S. national stage entry of International Patent Application No. PCT/US2023/012021, which claims priority of the U.S. Provisional Application No. 63/305,632 filed Feb. 1, 2022 and EP Application Serial No. 22156126.9 filed Feb. 10, 2022, all of which is incorporated herein by reference in its entirety.

TECHNOLOGY

The present invention relates generally to display techniques, and in particular, to display techniques using light regeneration materials.

BACKGROUND

Color filter arrays in image displays are commonly produced by photolithographic techniques, or printing techniques. These color filters typically consist of red, green and blue filters patterned over a pixel array to allow pixel elements to modulate light by color in addition to by intensity. In operation, a pixel element can vary intensity in light transmitting out of the pixel element. The intensity-modulated light of each pixel element can be further color-filtered by an overlaying color filter. Much light is wasted by color filtering and converted into harmful heat which can degrade performance and lifetime of an image display.

Thus, engineering a display system with relatively wide color gamut and relatively high peak luminance is challenging and costly endeavor by many display manufactures, as relatively expensive optical, electronic and mechanical components need to be integrated into an image display device.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which.

DESCRIPTION OF EXAMPLE POSSIBLE EMBODIMENTS

Figure 1:
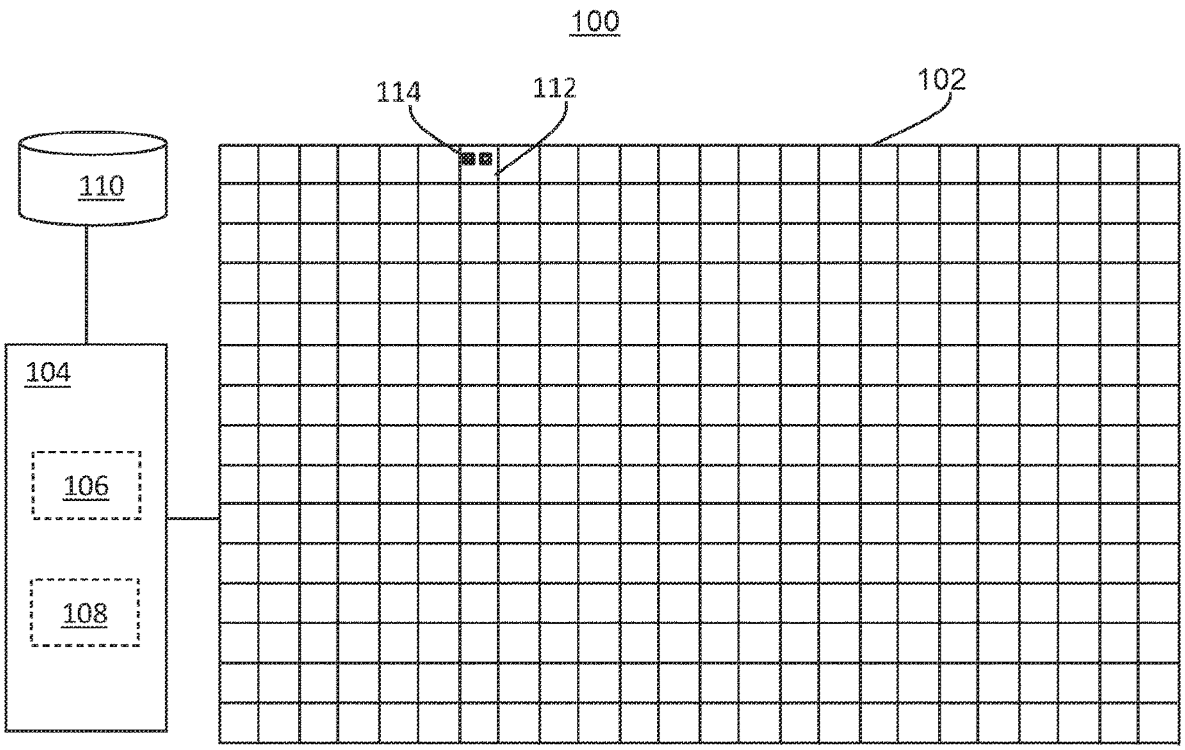
FIG. 1 illustrates an example display system.

Example possible embodiments, which relate to quantum dots and photoluminescent color filter, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. SUMMARY
2. STRUCTURE OVERVIEW
3. UNIT STRUCTURES
4. IN-CELL POLARIZER
5. SPECTRAL POWER DISTRIBUTION OF REGENERATED LIGHT
6. PREVENTING OR REDUCING METAMERISM FAILURES
7. WAVELENGTH BROADENING BASED ON COLOR SATURATION/LOCATION
8. EXAMPLE PROCESS FLOWS
9. EXAMPLE COMPUTER SYSTEM IMPLEMENTATION
10. EQUIVALENTS, EXTENSIONS, ALTERNATIVES AND MISCELLANEOUS

1. Summary

This overview presents a basic description of some aspects of a possible embodiment of the present invention. It should be noted that this overview is not an extensive or exhaustive summary of aspects of the possible embodiment. Moreover, it should be noted that this overview is not intended to be understood as identifying any particularly significant aspects or elements of the possible embodiment, nor as delineating any scope of the possible embodiment in particular, nor the invention in general. This overview merely presents some concepts that relate to the example possible embodiment in a condensed and simplified format, and should be understood as merely a conceptual prelude to a more detailed description of example possible embodiments that follows below.

In a display system, light that renders an image to a viewer travels through many optical layers, modules, structures, components, etc., from light sources to the viewer, and constitutes only a portion of total light output from the light sources. A significant portion of the total light output fails to reach the viewer for a variety of reasons. In an example, if a pixel is to represent a red pixel value in an image to be rendered, light of non-red colors is rejected or absorbed for the pixel. In another example, if a pixel is to represent a relatively dark pixel value in an image to be rendered, much of light incident on a light modulation layer such as a liquid crystal cell of the pixel is not allowed to transmit through the light modulation layer, as the liquid crystal cell is set to a relatively less transparent state based on the relatively dark pixel value.

Color filters or other optical layers n an image display as described herein can include light regeneration materials i to increase optical efficiencies. The light regeneration materials can be stimulated by light originated from light sources as well as recycled light. Shorter-wavelength light such as UV or blue light can be converted by the light regeneration materials into longer-wavelength light such as blue, green or red color light and reach the viewers.

Example light regeneration materials in image displays are described in as described in U.S. Provisional Application No. 61/486,160, filed on May 13, 2011, entitled "TECHNIQUES FOR QUANTUM DOTS"; U.S. Provisional Application No. 61/486,166, filed on May 13, 2011, entitled "TECHNIQUES FOR QUANTUM DOT ILLUMINATIONS"; U.S. Provisional Application No. 61/486,171, filed on May 13, 2011, entitled "QUANTUM DOT FOR DISPLAY PANELS," the contents of which are hereby incorporated herein by reference for all purposes as if fully set forth herein.

Techniques as described herein can be implemented with image displays to use the light regeneration materials in the color filters and/or other optical layers to generate additional image rendering light that can be used to support relatively high dynamic range, relatively wide color gamut, and relatively saturated colors in image rendering operations.

Additionally, optionally or alternatively, spectral power distributions (SPDs) of image rendering light from light source originated light and regenerated light from the light regeneration materials can be controlled or adjusted for individual pixels or individual pixel blocks based on pixel values, color saturations, etc., to be represented by the pixels or pixel blocks. For example, to prevent or reduce metamerism failures, a color to be represented by a pixel may be rendered with image rendering light of a specific SPD individually controlled or adjusted for the pixel or a pixel block that includes the pixel. The SPD may comprise relatively narrow band color primaries when the color to be represented is not susceptible to metamerism failures. Conversely, the SPD may comprise broadened or wide bands color light when the color to be represented is (deemed or determined to be) susceptible to metamerism failures.

Example embodiments described herein relate to image rendering operations with image displays. Image data for rendering an image on an image display to a viewer is received. The image data specifies a pixel value of the image for a pixel of the image display to render. The pixel value for the pixel includes multiple component pixel values corresponding to multiple color components of a color space. A color gamut locational value of the pixel value is computed based on two or more component pixel values in the multiple component pixel values of the pixel value specified for the pixel. The color gamut locational value is used to determine whether bandwidth broadening is to be applied to image rendering light produced by the pixel of the image display to render the pixel value. The image rendering light is directed to the viewer.

In some embodiments, a method comprises providing a display system as described herein. In some possible embodiments, mechanisms as described herein form a part of a display system, including but not limited to a handheld device, tablet computer, theater system, outdoor display, game machine, television, laptop computer, netbook computer, cellular radiotelephone, electronic book reader, point of sale terminal, desktop computer, computer workstation, computer kiosk, PDA and various other kinds of terminals and display units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Structure Overview

FIG. 1 illustrates an example display system 100 that comprises, or operates in conjunction with, an image display 102. The display system (100) includes display logic 104 implementing light source control logic 106 and (additionally, alternatively, optionally) light valve control logic 108.

The image display (102) comprises an array of pixels (one of which is 112) arranged in a (e.g., two-dimensional, curved surface, flat surface, regular shaped, irregular shaped, etc.) spatial pattern. Each pixel (e.g., 112, etc.) of the image display (102) may be made up of multiple subpixels (one of which is 114).

The light source control logic (106) controls and/or monitor operations of one or more light sources (e.g., back light unit, side light unit, array of light emitting diodes or LEDs each of which illuminates multiple pixels or multiple subpixels, array of micro LEDs each of which illuminates a single pixel or a single subpixel, etc.) emitting lights to illuminate some or all subpixels of pixels in the array of pixels of the image display (102).

The light valve control logic (108) controls and/or monitor operations of light valves in subpixels of pixels in the array of pixels of the image display (102).

The display logic (104) may be operatively coupled with an image data source 110 (e.g., a set-top box, networked server, storage media or the like) and may receive image data from the image data source (110). The image data may be received by the display logic (104) from the image data source (110) in a variety of ways including but not limited to one or more of: over-the-air broadcast, High-Definition Multimedia Interface (HDMI) data link, wired or wireless network/data connection, media/storage devices, set-top box, media streaming server, storage medium, etc.

In some operational scenarios, images/frames decoded or derived from the image data may be used by the light source control logic (106) to drive or control the light sources in the image display. The light source control logic (106) can use a pixel value to derive a specific digital (light) control or drive value, which in turn can be used by the light source control logic (106) (e.g., comprising light source control circuits, etc.) to drive or control a specific intensity to illuminate a single pixel or a single subpixel on a per-pixel basis, on a per-subpixel basis, on a per-pixel block basis, on a per-subpixel-group basis, and so on. In an example, the light source control logic (106) can use a group value or an averaged/subsampled/downsampled value of all pixel values in a (e.g., neighboring, contiguous, etc.) spatial region comprising a group of (e.g., neighboring, contiguous, etc.) pixels to derive the specific digital control or drive value to illuminate (e.g., only, etc.) the spatial region. In another example, the light source control logic (106) can use some or all individual subpixel values (e.g., corresponding to different color components/channels of a color space such as RGB, YCbCr, ICtCp, IPT, etc.) in a single pixel or in a single subpixel to derive the specific digital control or drive value to illuminate (e.g., only, etc.) the single pixel or the single subpixel.

In some operational scenarios, images/frames decoded or derived from the image data may be used by the light valve control logic (108) to drive or control the light valves in the image display. The light valve control logic (108) can use a pixel or subpixel value to derive a specific digital (valve) control or drive value, which in turn can be used by the light valve control logic (e.g., comprising column and/or row drive circuits, etc.) to drive or control a specific transmittance (for light transmission) of a pixel, a subpixel, a pixel block, a subpixel group, and so forth. In an example, the light valve control logic (108) can use a group value or an averaged, subsampled and/or downsampled value of all pixel values in a (e.g., neighboring, contiguous, etc.) spatial region comprising a group of (e.g., neighboring, contiguous, etc.) pixels to derive the specific digital control or drive value to set the specific transmittance for (e.g., only, etc.) the spatial region. In another example, the light valve control logic (108) can use some or all individual subpixel values (e.g., corresponding to different color components/channels of a color space such as RGB, YCbCr, ICtCp, IPT, etc.) in a single pixel or in a single subpixel to derive the specific transmittance for (e.g., only, etc.) the single pixel or the single subpixel.

In some operational scenarios, a unit structure in the image display (102) such as a pixel (e.g., 112, etc.) or a subpixel (e.g., 114, etc.) therein can comprise a per-pixel or per-subpixel light source (e.g., designated to illuminate only the pixel or the subpixel therein, etc.).

In an example, the unit structure does not comprise any light valve for which transmittance is controlled based on the image data to be rendered on the image display (102). Rather, an illumination—or brightness/luminance as perceived by a viewer of the image display (102)—of the pixel or the subpixel (represented by the unit structure) can be directly controlled by the light source control logic (106) with a digital control or drive value generated based on an image data portion set forth for the pixel or the subpixel. In the present example, each subpixel in the image display (102) may comprise per-subpixel light source(s) of which light emission(s) are regulated by the light source control logic (106) to generate (transmission) light to be directed toward a viewer (not shown; in front of the image display (102)) of images rendered on the image display (102). The operations of the light source control logic (106) cause the images/frames to be rendered by the array of pixels of the image display (102) at a spatial resolution supported by the received image data from the image data source (110) as well as supported by the image display (102). The light valve control logic (108) may be optionally omitted from the display logic (104) in this example.

In another example, the unit structure does not comprise any light source for which intensity/emission is controlled based on the image data to be rendered on the image display (102). Rather, each subpixel or pixel in some or all subpixels or pixels of the image display (102) may be illuminated with (e.g., constant, etc.) light originated from light source(s) of which light emission(s) are not regulated based on the image data or a downsampled/subsampled version thereof. Brightness/luminance as perceived by a viewer of the image display (102) of the pixel or the subpixel (represented by the unit structure) can be directly controlled by the light valve control logic (108) with a digital control or drive value generated based on an image data portion set forth for the pixel or the subpixel. In the present example, each subpixel in the image display (102) may comprise per-subpixel light valve(s) of which light transmittance(s) are regulated by the light valve control logic (108) to pass (transmission) light to be directed toward the viewer of images rendered on the image display (102). The operations of the light valve control logic (108) cause the images/frames to be rendered by the array of pixels of the image display (102) at a spatial resolution supported by the received image data from the image data source (110) as well as supported by the image display (102). The light source control logic (106) may be optionally omitted from the display logic (104) in this example.

In yet another example, the unit structure comprises both light sources for which intensity/emission is controlled based on the image data to be rendered on the image display (102) as well as light valves for which transmittance is controlled based on the image data to be rendered on the image display (102). Each subpixel or pixel in some or all subpixels or pixels of the image display (102) may be illuminated with (e.g., variable, etc.) light originated from the light sources of which light emission(s) are regulated (e.g., individually controlled, per pixel, per subpixel, per pixel bloc, per subpixel block, etc.) based on the image data or a downsampled/subsampled version thereof. In addition, transmittance(s) of light valves in each subpixel or pixel in some or all subpixels or pixels of the image display (102) may be regulated (e.g., individually controlled, per pixel, per subpixel, per pixel bloc, per subpixel block, etc.) based on the image data or a downsampled/subsampled version thereof. Thus, in the present example, brightness/luminance as perceived by a viewer of the image display (102) of the pixel or the subpixel (represented by the unit structure) can be collectively controlled by both the light source control logic (106) and the light valve control logic (108) with respective digital control or drive values each of which is generated based on an image data portion set forth for the pixel or the subpixel. The combined operations of the light source control logic (106) and the light valve control logic (108) cause the images/frames to be rendered by the array of pixels of the image display (102) at a spatial resolution supported by the received image data from the image data source (110) as well as supported by the image display (102). In the present example, in various operational scenarios, spatial resolution(s) supported by the light source control logic (106) may be the same as, lower than, or higher than, spatial resolution(s) supported by the light valve control logic (108). The highest spatial resolution supported by the image display (102) may correspond the highest spatial resolution in a set of spatial resolutions representing a set union of the spatial resolution(s) supported by the light source control logic (106) and the spatial resolution(s) supported by the light valve control logic (108).

3. Unit Structures

Unit structures such as pixel/subpixel structures can be implemented in one or more layers in the image display (102) of the display system (100) as illustrated in FIG. 1. Some or all of these layers can be used to control or regulate individual intensities as well as individual colors of light toward the viewer at a spatial resolution and/or an image refresh rate supported by the display system (100) or the image display (102) therein.

Figure 2A:
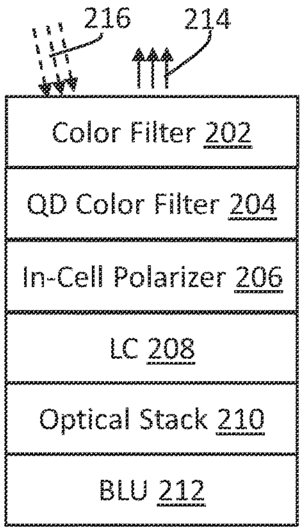
FIG. 2A through FIG. 2E illustrate example multi-layer configurations of a unit structure in image displays.

FIG. 2A illustrates a first example multi-layer configuration of a unit structure 200-1—which may also be referred to as a cell—representing a pixel or a subpixel therein of an image display (e.g., 102 of FIG. 1, etc.). The unit structure (200-1) comprises a backlight unit (BLU) layer portion (referenced as BLU 212) emitting a backlight portion designated to illuminate other layer portions of the unit structure (200-1). These other layer portions of the unit structure (200-1) may include, but are not necessarily limited to only, some or all of: an optical stack layer portion (referenced as optical stack 210), a light valve layer portion (referenced as liquid crystal or LC 208), an in-unit-structure polarizer layer portion (referenced as in-cell polarizer 206), a light regeneration color filter layer portion (referenced as quantum dot or QD color filter 204), a (non-light-regeneration) color filter layer portion (referenced as color filter 202), and so forth.

It should be noted that the multi-layer configuration of FIG. 2A is for illustration purposes only. In various embodiments, a unit structure as described herein may contain more or fewer layer portions as illustrated. Additionally, optionally or alternatively, different types of layer portions can be incorporated into a unit structure as described herein, in addition to or in place of some or all of the layer portions as illustrated in FIG. 2A. For example, in addition to or in place of the BLU (110), a side-lit light unit portion may be incorporated or used with a light guide to direct or guide side-lit light generated and received from the side-lit light unit to illuminate remaining portions of a unit structure as described herein.

A layer portion in the unit structure (200-1) may or may not be a portion of a (e.g., continuous, contiguous, undivided, etc.) uniform or homogeneous layer.

In an example, the color filter (202) in the unit structure (200-1) and other color filters on other unit structures of the image display (102) of FIG. 1 may be of the same type and collectively form a uniform or homogeneous finish color filter layer (e.g., coated or disposed on a substrate glass, etc.) covering a (non-uniform or non-homogeneous) light regeneration color filter layer of which the QD color filter (204) is a part. In the present example, the color filter (202) may be a multi-band color filter that permits passing a combination of light wavelength bands of colors represented in image rendering light from different subpixels of different colors or different color compositions in the image display (102). The color filter (202) can be used to prevent or reduce the possibility of an ambient light portion 216 incident on the unit structure (200-1) exciting the QD color filter to cause regenerating a regenerated light portion (e.g., as a part of an image rendering light portion 214, etc.) dependent on (intensity and composition of) the ambient-light portion (216), thereby causing the image rendering light portion (214) directed to the viewer from the unit structure (200-1) to become inaccurate in terms of color precision, color saturation and/or dynamic range.

In another example, the color filter (202) in the unit structure (200-1) and other color filters on other unit structures of the image display (102) of FIG. 1 may be of different types and collectively form a non-uniform or non-homogeneous color filter layer. The color filter (202) may be a single-band or multi-band color filter that permits passing a combination of light wavelength bands of one or more colors of light emitted from or directed to the QD color filter (204) which the color filter (202) covers. As compared with the previous example, the color filter (202) in the present example can be more effectively used to prevent or reduce the possibility of the ambient light portion (216) incident on the unit structure (200-1) exciting the QD color filter to cause regenerating a regenerated light portion (e.g., as a part of an image rendering light portion 214, etc.) dependent on (intensity and composition of) the ambient-light portion (216), thereby causing the image rendering light portion (214) directed to the viewer from the unit structure (200-1) to become inaccurate in terms of color precision, color saturation and/or dynamic range.

The QD color filter (204) may be a portion of a light regeneration color filter layer that is made up of a 2D pattern/array of light regeneration color filters—over or in a corresponding 2D pattern/array of unit structures—imparting different colors in image rendering light (a portion of which is 214 of FIG. 2A) toward the viewer. Likewise, the LC (208) may be a portion of a light valve layer (also referred to as "light modulation layer") that is made up of a 2D pattern/array of light valves—over or in a corresponding 2D pattern/array of unit structures—controlled by individually different electrodes driven by the light valve control logic (108) of FIG. 1.

Each layer portion in some or all layer portions of the unit structure such as the BLU 110, the LC 106, etc., in FIG. 2A may be actively (e.g., with electronic/optical pulses/signals generated by electronic or optical components such as light source and/or light valve control circuits, etc.) controlled based at least in part on an image data portion specifying an image portion to be rendered by the unit structure.

Figure 2B:
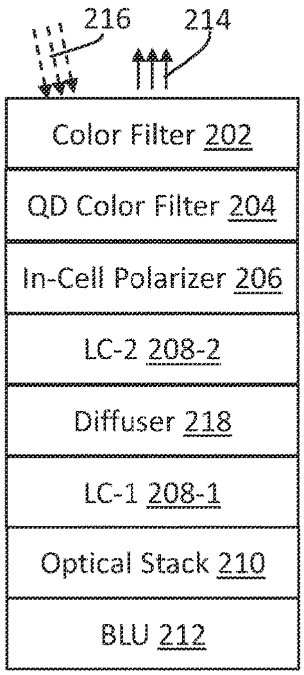

FIG. 2B illustrates a second example multi-layer configuration of a unit structure 200-2 representing a pixel or a subpixel therein of an image display (e.g., 102 of FIG. 1, etc.). The unit structure (200-2) comprises a backlight unit (BLU) layer portion (e.g., the BLU (212), etc.) emitting a backlight portion designated to illuminate other layer portions of the unit structure (200-2). These other layer portions of the unit structure (200-2) may include, but are not necessarily limited to only, some or all of: an optical stack layer portion (e.g., the optical stack (210), etc.), a first light valve layer portion (referenced as LC 208-1), a light diffuser layer portion (referenced as diffuser 218), a second light valve layer portion (referenced as LC 208-2), an in-unit-structure polarizer layer portion (e.g., the in-cell polarizer (206), etc.), a light regeneration color filter layer portion (e.g., the QD color filter (204), etc.), a color filter layer portion (e.g., the color filter (202), etc.), and so forth.

The unit structure (200-2) incorporates or uses multiple light valve (or modulation) layers. These light valves can be used to increase the entire dynamic range of the image display (102). For example, when each light valve layer supports a 256 different dynamic range levels, a combination or incorporation of two light valve layers can support possibly up to 256 times 256 dynamic range levels, thereby significantly increasing availability of contrast levels in the entire dynamic range of the image display (102). In addition to an increase in the total number of representable luminance levels, as compared with an image display with a single light valve layer, brighter light sources can be adopted, incorporated or used in an image display with multiple light valve layers to increase the peak luminance. Further, as compared with an image display with a single light valve layer, a darker black level can be achieved in an image display with multiple light valve layers.

As both light valve layers can have regular patterns, visual artifacts such as Moire patterns may be prone to occur. A light diffuser layer of which the diffuser 218 is a part may be incorporated or disposed in between a first light valve layer of which the LC-1 (208-1) is a part and a second light valve layer of which the LC-2 (208-2) is a part. The light diffuser layer such as a holographic or non-holographic light diffuser can be incorporated into the image display (102) to diffuse light transmitted through the first light valve layer toward the second light valve layer to prevent or significantly reduce the Moire patterns.

Figure 2C:
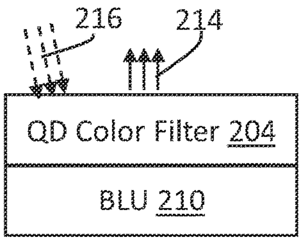

FIG. 2C illustrates a third example multi-layer configuration of a unit structure 200-3 representing a pixel or a subpixel therein of an image display (e.g., 102 of FIG. 1, etc.). The unit structure (200-2) comprises a backlight unit (BLU) layer portion (e.g., the BLU (212), etc.) emitting a backlight portion designated to illuminate one or more other layer portions of the unit structure (200-2). In some embodiments, the backlight portion can illuminate a light regeneration color filter layer portion (e.g., the QD color filter (204), etc.) without going through any light valve (or modulation) layer. Intensity and/or color(s) of the backlight portion illuminating the QD color filter (204) may be directly regulated by light source control logic (e.g., 106 of FIG. 1, etc.) based on image data or a portion thereof.

For illustration purposes only, it has been described that a light valve layer in unit structures as illustrated in FIG. 2A and FIG. 2B may be implemented as a liquid crystal layer. It should be noted that, in various embodiments, either LC-based or non-LC-based light valve (or modulation) layers may be incorporated into unit structures of an image display as described herein.

For illustration purposes only, it has been described that a (non-light-regeneration) color filter layer in unit structures as illustrated in FIG. 2A and FIG. 2B may be incorporated to prevent or reduce ambient light induced regenerated light. It should be noted that, in various embodiments, such a color filter layer may or may not be incorporated into unit structures of an image display as described herein. For example, as illustrated in FIG. 2E, a (uniform or homogeneous) finish polarizer layer of which a finish polarizer layer portion (referenced as finish polarizer 220) coated on an upper surface of a uniform or homogeneous substrate of which a substrate portion (referenced as glass 222) can be used in place of or in addition to a color filter layer.

In rendering operations of the image display (102), the finish polarizer polarizes the ambient light incident on the substrate layer into a specific linear or circular polarized state. The ambient incident light is then reflected by the substrate into reflection light of a polarized state orthogonal to the specific linear or circular polarized state. The reflection light of the orthogonal state is absorbed, rejected or otherwise filtered out by the finish polarizer, thereby preventing the reflection light from becoming mixed with or a part of image rendering light to reach the viewer. Some ambient light may still reach the QD color filter (204) and cause the QD color filter (204) to regenerate ambient-light induced light of different polarized states including the specific linear or circular polarized state that can transmit through the finish polarizer (220) toward to the viewer.

In comparison, in image rendering operations of an image display (102) implementing unit structures of FIG. 2A or FIG. 2B, a color filter layer can filter more ambient light and thus is less likely to cause the QD color filter (204) to regenerate ambient-light induced light that can transmit through the finish polarizer (220) toward to the viewer.

4. In-Cell Polarizer

A unit structure in the image display (102) may include layer portion(s) that may be designed to transmit, reflect, absorb and/or recycle light of a specific polarized state in image rendering operations. For example, a light valve layer portion such as illustrated in FIG. 2A, FIG. 2B or FIG. 2E may be implemented with a specific optical axis and may be designed to transmit light of a first polarized state and reject light of a second polarized state orthogonal to the first polarized state when electrodes used to control the light valve layer portion is in a fully-on state with the highest transmittance in the image rendering operations.

A light regeneration layer portion such as a QD color filter in the unit structure may regenerate light of different polarized states, some of which may be transmittable through the light valve layer portion while others of which may be reflected by the light valve layer portion.

In some embodiments, for the purpose of redirecting light to the viewer relatively effectively, an in-cell polarizer may be disposed between the QD color filter and the light valve layer portion to cause regenerated light—regenerated by the QD color filter—of the first polarized state to be reflected toward the viewer. In addition, regenerated light—regenerated by the QD color filter—of the second polarized state may be reflected toward the viewer by the light valve layer portion. As a result, a relatively high dynamic range in the unit structure in the present example can be supported or achieved than a unit structure that does not implement techniques as described herein. Additionally, optionally or alternatively, a reflection enhancement layer portion (or film) that transmits the second polarized state and reflects the first polarized state can be used in addition to or in place of the in-cell polarizer.

5. Spectral Power Distribution of Regenerated Light

A light regeneration layer such as a layer of QD color filters in a spatial array/pattern of pixels of the image display (102) can be made up of light regeneration materials that are excited by injected light (e.g., blue light, ultraviolet or UV light, narrow band injected light originated from light source(s), etc.) to regenerate light of different wavelengths. The light regeneration materials may be selected to regenerate light of color primaries (e.g., red, green and blue in a RGB color system, etc.) of narrow (wavelength) band, wide (wavelength) band, and so forth, from injected light received by the light regeneration materials.

Narrow bands for light of different colors may be measured or specified with different wavelength ranges or subranges of nanometers. Examples of light of a color (e.g., representing a color primary, representing a color other than a color primary, etc.) of narrow band may include, but are not necessarily limited to only, blue or near blue color light within a wavelength band of 5-20 nanometers or less, green or near green color light within a wavelength band of 5-30 nanometers or less, red or near red color light within a wavelength band of 5-40 nanometers or less, and so forth. As used herein, the term “wide band,” “broadened band,” or “wider band,” may refer to a wavelength band that is (e.g., 25%, 50%, 75%, 100% or more, etc.) wider than a narrow band. In an example, wide band for light of blue color may be measured or specified with a wavelength range (e.g., 25%, 50%, 75%, 100% or more, etc.) larger than the wavelength range or the narrow band for light of blue color. In another example, wide band for light of green color may be measured or specified with a wavelength range (e.g., 25%, 50%, 75%, 100% or more, etc.) larger than the wavelength range or the narrow band for light of green color. In another example, wide band for light of red color may be measured or specified with a wavelength range (e.g., 25%, 50%, 75%, 100% or more, etc.) larger than the wavelength range or the narrow band for light of red color. As used herein, the term “broadband” may refer to the entire (or 80%, 90% or more) visible light spectrum.

Regenerated light of a first wavelength (or wavelength band) can be regenerated by specific light regeneration materials (e.g., specific QD types, specific luminescent material types, etc.) that are excited by injected light of a second wavelength (or wavelength band) higher than the first wavelength (or wavelength band).

In image rendering operations, a light spectral power distribution (or SPD)—or a distribution of light intensity over wavelengths or wavelength ranges in the entire visible light wavelength spectrum—of regenerated light directed to the viewer by a unit structure or a group of unit structures as described herein may be specifically tuned, based on preconfigured light regeneration material types in the light regeneration portion of the unit structure and a (e.g., real time, runtime, dynamically tunable/controllable, etc.) light spectral power distribution of injected light.

By selecting specific types of light regeneration materials to be manufactured into a unit structure or a group of (e.g., spatially adjacent, belonging to the same pixel, belonging to two spatially adjacent pixels, etc.) unit structures, by controlling light sources that generate specific power distributions of injected light to the light regeneration materials based at least in part on image data, and/or by controlling transmittance of light valve layer(s), the unit structure or group of unit structures can direct specific light spectral power distributions of regenerated light to be directed to the viewer during image rendering operations. In an example, different types of light regeneration materials may be included in the unit structure or the group of unit structures. Some of the types of the light regeneration materials may regenerate color primaries of relatively narrow bands (e.g., 10, 20 or 30 nanometers, etc.). Some others of the types of the light regeneration materials may regenerate color primaries of wider bands (e.g., 30 nanometers, 40 nanometers, 50 nanometers or more, etc.). Additionally, optionally or alternatively, some others of the types of the light regeneration materials may regenerate non-color primaries of narrow or wide bands, which may be of adjacent wavelengths (or wavelength bands) next to wavelengths (or wavelength bands) of color primaries.

In some embodiments, some or all of these different types of light regeneration materials may be excited or stimulated to regenerate light using injected light (e.g., of narrow or wide band, etc.) emitted by the same type of light sources. In some embodiments, some or all of these different types of light regeneration materials may be excited or stimulated to regenerate light using injected light (e.g., of narrow or wide band, of different narrow or wide bands, etc.) emitted by different types of light sources.

In image rendering operations, in response to determining that color primaries of narrow bands are to be generated or regenerated at particular (light) intensities, light sources can be controlled to emit light of specific intensities and specific wavelengths (or wavelength bands) that excite or stimulate specific types of the light regeneration materials to generate the color primaries of narrow bands with the particular intensities.

Additionally, optionally or alternatively, in response to determining that color primaries of wider bands are to be generated or regenerated at particular (light) intensities, light sources can be controlled to emit light of specific intensities and specific wavelengths (or wavelength bands) that excite or stimulate specific types of the light regeneration materials to generate the color primaries of wider bands with the particular intensities.

Additionally, optionally or alternatively, in response to determining that non-color primaries of narrow or wide bands are to be generated or regenerated at particular (light) intensities, light sources can be controlled to emit light of specific intensities and specific wavelengths (or wavelength bands) that excite or stimulate specific types of the light regeneration materials to generate the color primaries of narrow or wide bands with the particular intensities.

It should be noted that light of different wavelengths (or wavelength bands) may be generated or regenerated by the unit structure or group of unit structures, time sequentially, concurrently, or time sequentially in part concurrently in part.

6. Preventing or Reducing Metamerism Failures

A narrow band color as rendered by a unit structure or a group of unit structures—e.g., 10—nanometer blue color primary, 20—nanometer green color primary, 30—nanometer red color primary, etc.—may be perceived differently by different viewers, due to metameric failures that can occur because of differences in color vision between or among the viewers. For example, Asian women may see or visually perceive narrow band red (rendered by red color light of narrow band) perceptually different from non-Asian women. Different viewers may see or visually perceive narrow band white—e.g., rendered with a set of narrow band color primaries—perceptually differently. Some viewers may even see or visually perceive the narrow band white as pink instead of white.

Techniques as described herein can be implemented to prevent or reduce metamerism failures, thereby enabling different viewers of a viewer population to see or visually perceive a color with the same matched perception of the color or with no or little perceptual differences. These techniques can be used to render a red color primary with a specific SPD that enables both Asian and non-Asian Women to perceive the rendered color as the same red. Likewise, these techniques can be used to render white with a specific SPD that enables all or substantially all (e.g., 99%, etc.) viewers in a viewer population to perceive the rendered color as the same white.

In some operational scenarios, a specific SPD with which a specific color is rendered may comprise a specific mixture or stack of light of different wavelength bands such as a mixture or stack of different narrow and/or wide bands. The specific mixture or stack of wavelength bands may include (1) one or more narrow bands corresponding to one or more color primaries and (2) one or more narrow and/or wide bands corresponding to one or more of: color primaries or colors other than color primaries. Wavelength composition in an SPD for a color rendered with a pixel of an image display as described herein may be set or customized at runtime during image rendering operations, based at least in part on a to-be-rendered pixel value (representing the color) in received image data.

Figure 2D:
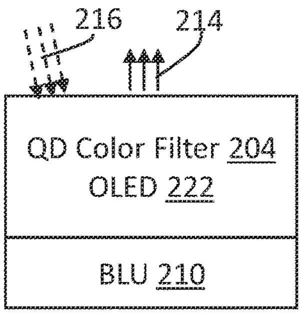
Figure 2E:
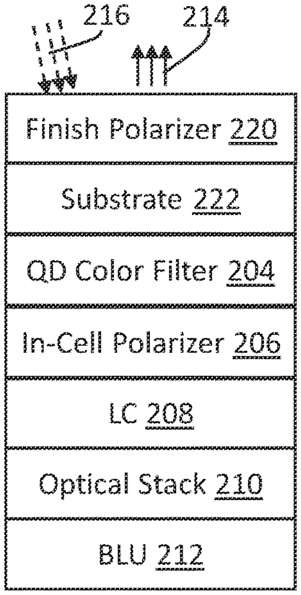
Figure 2F:
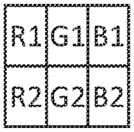
FIG. 2F through FIG. 2K illustrate example pixels each with multiple subpixels.

FIG. 2F illustrates an example pixel 230-1 in a spatial array/pattern of pixels of an image display. As shown, the pixel (230-1) includes a group of subpixels (or subpixel unit structures) of different subpixel types respectively denoted as "R1", "G1", "B1", "R2", "G2", "B2", etc.

Figure 3A:
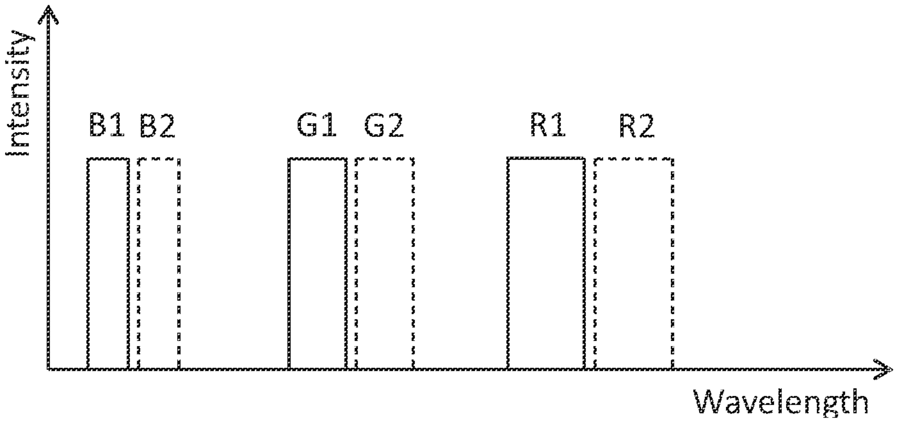
FIG. 3A and FIG. 3B illustrate example spectral power distributions (SPD) of narrow and wide band light.

In some embodiments, when in a fully on (e.g., fully transparent, corresponding to the highest transmittance or brightest luminance, etc.), as illustrated in FIG. 3A, these subpixel types ("R1", "G1", "B1", "R2", "G2", "B2") produce light of SPDs of different narrow bands directed to the viewer.

Figure 3B:
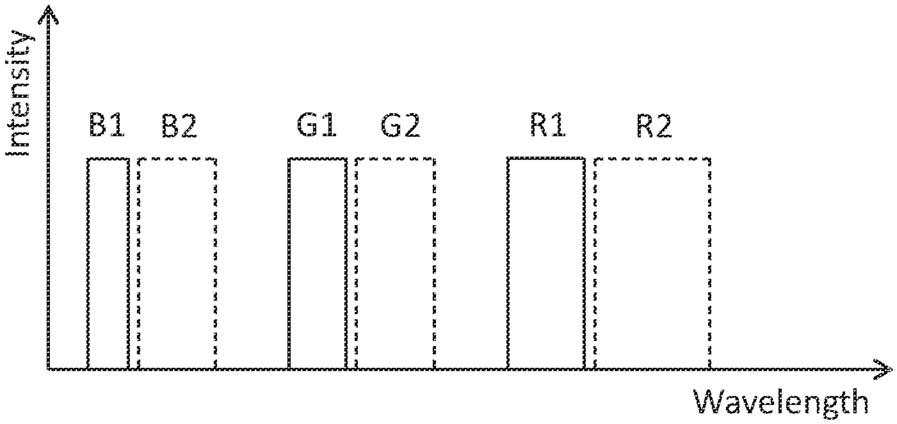

In some embodiments, when in a fully on (e.g., fully transparent, corresponding to the highest transmittance or brightest luminance, etc.), as illustrated in FIG. 3B, the subpixel types ("R1", "G1", "B1") produce light of SPDs of different narrow bands directed to the viewer, whereas the subpixel types ("R2", "G2", "B2") produce light of SPDs of different wide bands directed to the viewer.

Figure 3C:
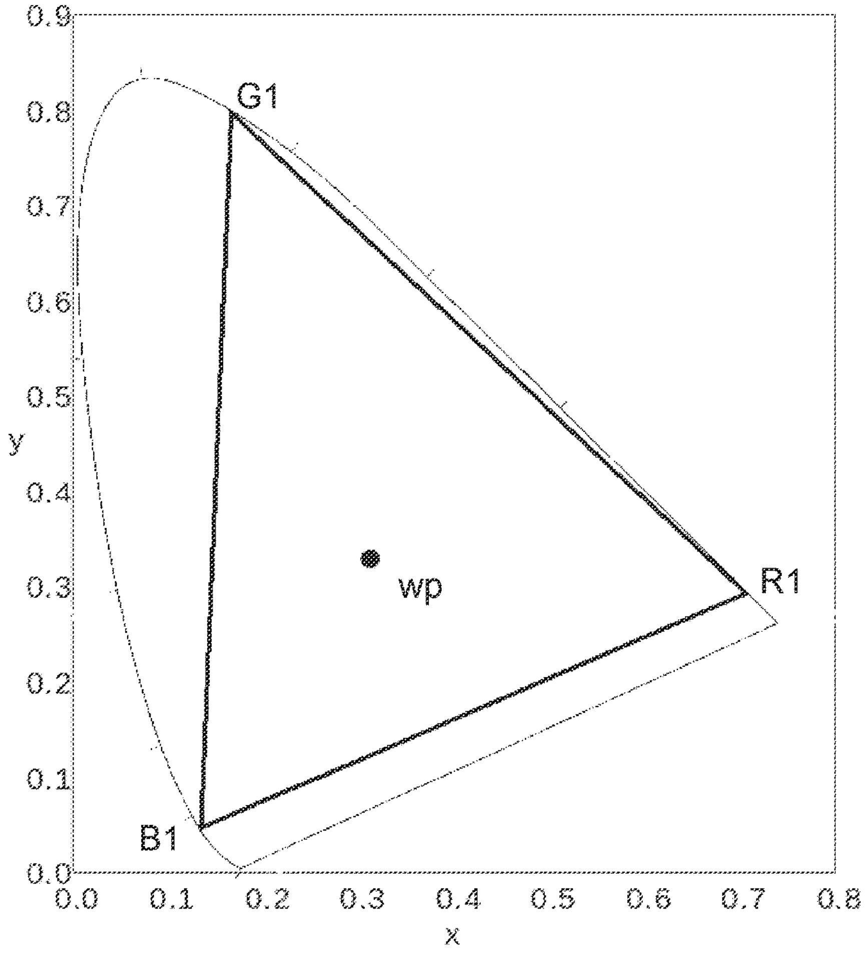
FIG. 3C through FIG. 3E illustrate example color gamuts.

In some embodiments, the subpixels "R1", "G1" and "B1" in the pixel (230-1) can be used or driven to produce viewer-directed light that render three color primaries, each of which represents a respective vertex—one of vertices "R1", "G1", "B1" as illustrated in FIG. 3C—in a plurality of vertices defining a color gamut illustrated as a triangle in FIG. 3C. The color gamut comprises all colors that can be supported or produced by the image display using subpixels of types "R1", "G1" and "B1".

Some or all of the subpixels "R2", "G2" and "B2" in the pixel (230-1) can be used or driven to produce viewer-directed light of wavelength bands other than those in the SPDs of the subpixels "R1", "G1" and "B1". The viewer-directed light produced by the subpixels "R2", "G2" and "B2" in the pixel (230-1) can be superimposed with the viewer-directed light produced by the subpixels "R1", "G1" and "B1" in the pixel (230-1) to forms a mix or stack of light wavelength bands to broaden wavelength bands in a resultant SPD of the overall viewer directed light produced by the pixel (230-1).

Under techniques as described herein, this mix or stack of light wavelength bands or the resultant SPD can be tuned—at runtime during image rendering operations—by controlling or driving these subpixels based on a pixel value to be rendered by the pixel (230-1) to render a color represented by the pixel value and enable different viewers to perceive the color rendered by the pixel (230-1) with matched color perception, thereby preventing or reducing metamerism failures in images rendered by the image display.

For the purpose of illustration only, it has been described that a resultant SPD of overall viewer directed light produced by a pixel may be tuned with three subpixels of types used to produce color primaries of narrow wavelength bands and three additional subpixels of additional types used to broaden these color primaries or their (e.g., narrow, etc.) wavelength bands. It should be noted that, in other embodiments, a pixel as described herein can include more or fewer subpixel types as well as other pixel structures other than depicted in FIG. 2F. Additionally, optionally or alternatively, in some embodiments, a unit structure (e.g., a subpixel, etc.) used to broaden narrow band color primaries produced by a pixel can be shared by more than one pixel. For example, the unit structure can be placed in equal distance to a group of pixels that includes the pixel and one or more adjacent pixels. Narrow band color primaries produced by each of the one or more adjacent pixels to the pixel can also be broadened by the unit structure.

FIG. 2G, FIG. 2H, FIG. 2I and FIG. 2J illustrate example pixels 230-2, 230-3, 230-3 and 230-4, respectively, in spatial arrays/patterns of pixels of image displays.

Figure 2G:
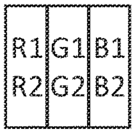

As shown in FIG. 2G, the pixel (230-2) includes a group of subpixels (or subpixel unit structures) of different subpixel types respectively denoted as “R1 R2”, “G1 G2”, “B1 B2”, etc.

In a first example, each of the subpixel types (“R1 R2”, “G1 G2”, “B1 B2”) in the pixel (230-2) of FIG. 2G may be implemented as the subpixel (200-1, 200-2 or 200-3) of FIG. 2A, FIG. 2B or FIG. 2C to include light regeneration materials (e.g., QD, luminescent, etc.) of two types that regenerate light in response to receiving injected light of different light sources. By controlling or adjusting different (e.g., UV, blue light, different light wavelengths and/or intensities, different backlight types, etc.) combinations of injected light originating from light sources, each of the subpixel types (“R1 R2”, “G1 G2”, “B1 B2”) in the pixel (230-2) of FIG. 2G produce light of SPDs of different narrow or wide bands directed to the viewer.

In a second example, each of the subpixel types (“R1 R2”, “G1 G2”, “B1 B2”) in the pixel (230-2) of FIG. 2G may be implemented as the subpixel (200-4) of FIG. 2D to include an organic light-emitting diode (OLED or organic LED) to generate (e.g., narrow band, etc.) light in one of the wavelength bands “R1” and “R2” of FIG. 3A or FIG. 3B and to include light regeneration materials (e.g., QD, luminescent, etc.) that regenerate light in the other of the wavelength bands “R1” and “R2” of FIG. 3A or FIG. 3B in response to receiving injected light. By controlling or adjusting different (e.g., UV, blue light, different light wavelengths and/or intensities, different backlight types, etc.) combinations of digital drive values to the OLED, to light sources generating the injected light and/or to control transmittance of light valve layer(s), each of the subpixel types (“R1 R2”, “G1 G2”, “B1 B2”) in the pixel (230-2) of FIG. 2G produce light of SPDs of different narrow or wide bands directed to the viewer.

At runtime during image rendering operations, the subpixel “R1 R2” in the pixel (230-2) of FIG. 2G can produce up to the highest intensity for the narrow band “R1” of FIG. 3A or FIG. 3B, up to the highest intensity for the narrow or wide band “R2” of FIG. 3A or FIG. 3B, or any combination of the foregoing. Similarly, the subpixel “G1 G2” in the pixel (230-2) of FIG. 2G can produce up to the highest intensity for the narrow band “G1” of FIG. 3A or FIG. 3B, up to the highest intensity for the narrow or wide band “G2” of FIG. 3A or FIG. 3B, or any combination of the foregoing. The subpixel “B1 B2” in the pixel (230-2) of FIG. 2G can produce up to the highest intensity for the narrow band “B1” of FIG. 3A or FIG. 3B, up to the highest intensity for the narrow or wide band “B2” of FIG. 3A or FIG. 3B, or any combination of the foregoing.

Figure 2H:
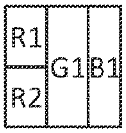

As shown in FIG. 2H, the pixel (230-3) includes a group of subpixels (or subpixel unit structures) of different subpixel types respectively denoted as “R1”, “G1”, “B1”, “R2”, etc. The subpixel “R2” may be used to broaden a red color primary in combination with the subpixel “R1” for the pixel (230-3).

Figure 2I:
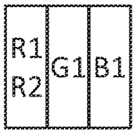

As shown in FIG. 2I, the pixel (230-4) includes a group of subpixels (or subpixel unit structures) of different subpixel types respectively denoted as “R1 R2”, “G1”, “B1”, etc. The subpixel “R1 R2” may be used to generate narrow band red color primary as well as broadened band red color primary using a combination of any of one or more OLEDs, one or more QD types, one or more luminescent types.

Figure 2J:
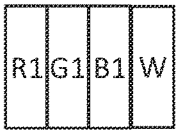
Figure 2K:
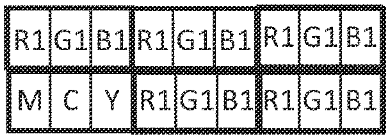

Wavelength bands of color primaries may also be broadened with colors not similar to the color primaries. In an example as shown in FIG. 2J, the pixel (230-5) includes a group of subpixels (or subpixel unit structures) of different subpixel types respectively denoted as “R1”, “G1”, “B1”, “W”, etc. The subpixel “W” may be used to produce a white of multi wavelength bands that can be combined with one, some or all color primaries produced by the subpixels “R1”, “G1” and/or “B1”. In another example as shown in FIG. 2K, a group of (e.g., five, etc.) pixels each of which includes a group of subpixels (or subpixel unit structures) of different subpixel types respectively denoted as “R1”, “G1”, “B1”, etc., may share one or more of unit structures “M”, “C” and “Y” that produce magenta, cyan and yellow colors. These additional unit structures “M”, “C” and “Y” may be used to produce single or multiple wavelength bands that can be combined with one, some or all color primaries produced by the subpixels “R1”, “G1” and/or “B1” in the group of pixels. These unit structures may be relatively uniformly or sparsely deployed in the spatial array/pattern of pixels in the image display (102) so that light from these unit structures play a supporting role of broadening wavelength bands to prevent or reduce metamerism failures rather than becoming visually noticeable.

The human visual system (HVS) encounters least metamerism failure with respect to blue light of narrow band and less metamerism failure with respect to green light of narrow band. In some embodiments, additional subpixel types or additional wavelength bands may be used to broaden wavelength bands for only a subset of color primaries, such as red in an RGB color system as illustrated in FIG. 2H and FIG. 2I, red and green (not shown), and so forth.

Under techniques as described herein, a mix or stack of light wavelength bands or a resultant SPD can be tuned—at runtime during image rendering operations—by controlling or driving these subpixels based on a pixel value to be rendered by the pixel (230-2, 230-3 or 230-4) to render a color represented by the pixel value and enable different viewers to perceive the color rendered by the pixel (230-2, 230-3 or 230-4) with matched color perception, thereby preventing or reducing metamerism failures in images rendered by the image display.

7. Wavelength Broadening Based on Color Saturation/Location

Figure 3D:
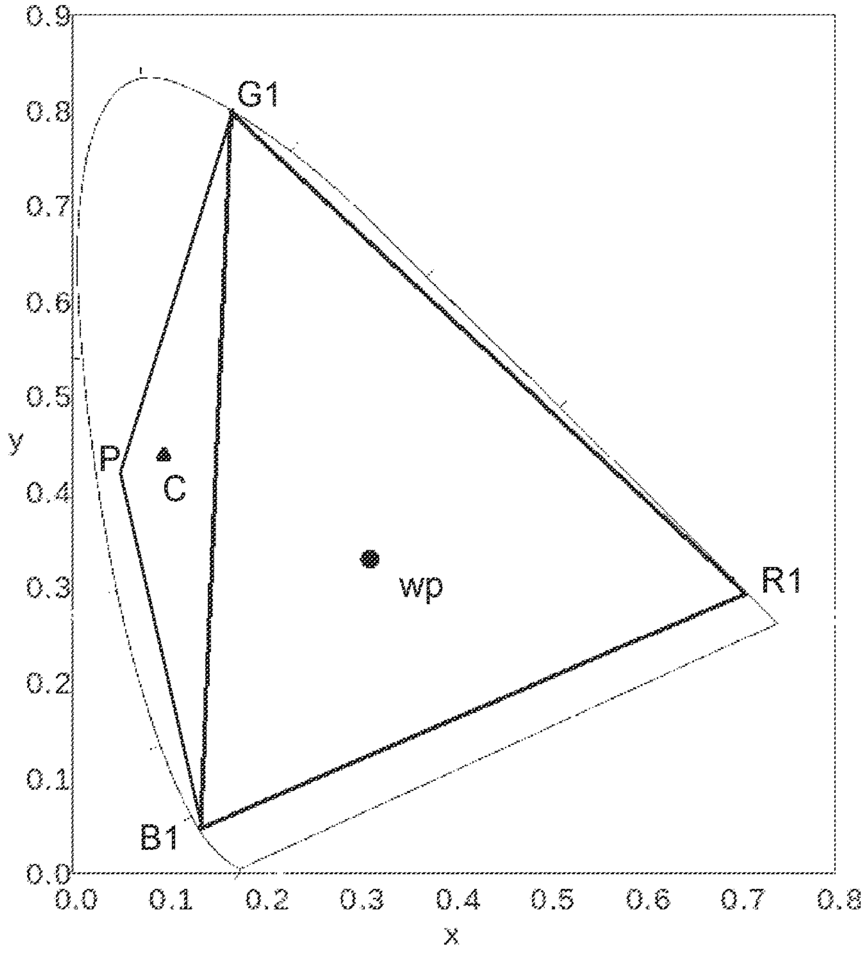
Figure 3E:
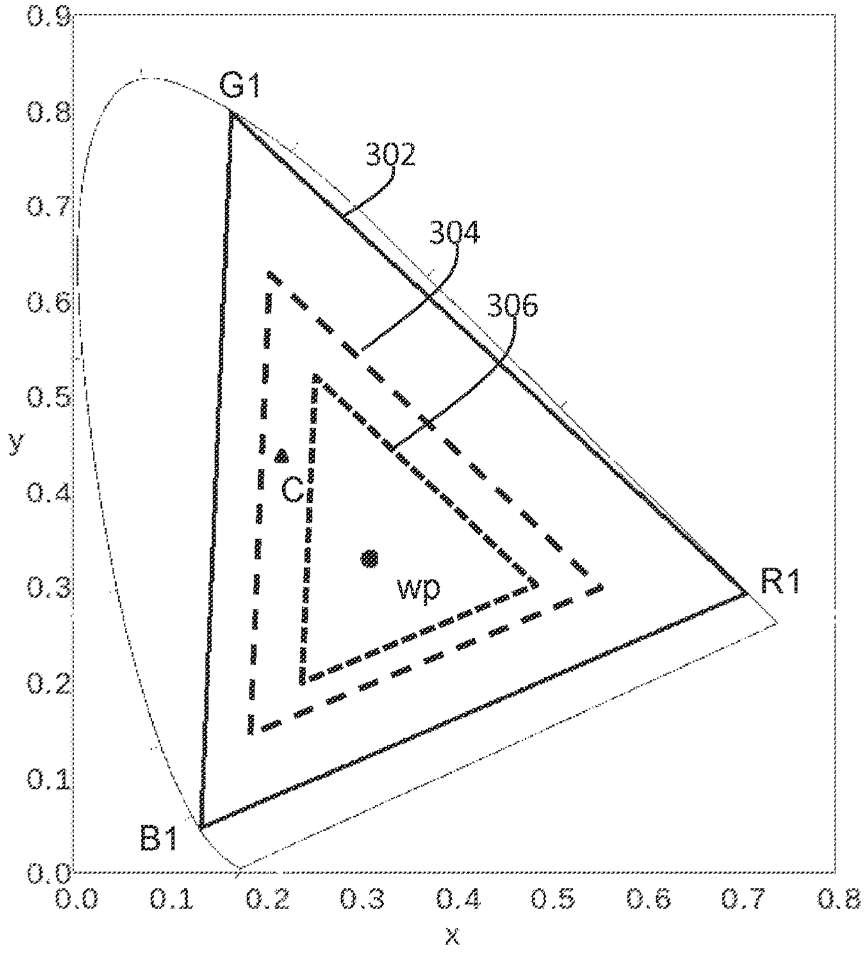

A pixel value for a pixel may be used to determine or represent a (color gamut) location of a color represented by the pixel value in a color gamut, which is enclosed by a first contour 302 (e.g., formed by the most saturated colors supported by a combination of three color primaries R1, G1 and B1, etc.) as illustrated in FIG. 3E.

A color saturation value (or saturation in short) of the color represented by the pixel value may be estimated, determined or computed to represent the (color gamut) location of the pixel value using any in a variety of color saturation computation methods. In an example, the color saturation value may be estimated, determined or computed based at least in part on a distance measure (e.g., represented with a function of component pixel values in a pixel value, etc.) that measures a linear or non-linear distance between the color and the white point (denoted as "wp") or an applicable (e.g., the closest, colorless, etc.) gray value in a color space in which the color gamut is represented. In another example, the color saturation value may be estimated, determined or computed by using a combination of component pixel values in the pixel value to search or look up a saturation value lookup table indexed with different unique combinations of component pixel values of different possible pixel values.

The HVS's sensitivity or possibility for metamerism failures may depend on a number of factors including but not limited to color location or saturation in the color gamut. Highly saturated colors (e.g., green, blue, etc.) may be perceived with matched color vision by most if not all viewers, even if these colors are rendered with narrow bandwidth light of colors. In contrast, mixed colors closer to the white point may be perceived differently if these mixed colors are rendered with narrow bandwidth light of colors.

Under other approaches that do not implement techniques as described herein, the entire color gamut (e.g., as delineated with the first contour (302) of FIG. 3E, etc.) may be rendered with color primaries (e.g., "R1", "G1" and "B1", etc.), each of which is of a fixed representative wavelength (e.g., peak wavelength of an SPD, a mid-point wavelength of a wavelength band, etc.) and a fixed narrow bandwidth. As a result, metamerism failures are relatively prone to occur in image displays under those other approaches, especially for colors that are less saturated and closer to the white point.

In contrast, under techniques as described herein, different colors in the color gamut may be rendered with light of different compositions of narrow band or wide band color primaries and/or other colors other than color primaries and/or other wavelength bands other than color primaries of narrow bands based at least in part on specific color locations/saturations of these different color colors.

Under the techniques as described herein, a color (denoted as c) to be rendered by an image display may be rendered with light of a mix or stack of one or more wavelength bands respectively characterized by one or more representative wavelengths denoted as w and one or more bandwidths denoted as bw, based on a mapping function denoted as $f(\ )$ as follows:

$$c = f(w, bw) \tag{1}$$

where a specific composition of the representative wavelengths w and the bandwidths bw in expression (1) may be adjusted or set at runtime during image rendering operations based at least in part on a specific location or saturation of the color c in a color gamut.

The mapping function $f(\ )$ maps a specific SPD represented by the mix or stack of the one or more wavelength bands to a specific color (c) as perceived by the HVS. The mapping function may be constructed with tristimulus color matching functions that integrate over the SPD to obtain corresponding tristimulus values as perceived by the HVS. From the tristimulus values computed with the tristimulus color matching functions based on the specific SPD, the specific color (c) such as a RGB pixel value, a YCbCr pixel value may be obtained.

A representative wavelength may be a peak wavelength, a mid-point wavelength, etc., of a corresponding wavelength band. A bandwidth corresponding to the representative wavelength may be a measure of width of the wavelength band.

For illustration purposes only, a step function has been used to depict or represent light intensity distributed over a wavelength range or band in FIG. 3A and FIG. 3B. It should be noted that, in various embodiments, other functions other than step functions may be used to depict or represent light intensity distributed over a wavelength range or band.

In some embodiments, the color gamut of FIG. 3E may be partitioned into three different color gamut regions: a first color gamut region between the first contour (302) and a second contour (304), a second color gamut region between the second contour (304) and a third contour (306), and a third color gamut region within the third contour (306). Colors in the first color gamut region have the highest saturation, are located the farthest from the white point, and are least prone to metamerism failures. Colors in the third color gamut region have the least saturation, are located the closest to the white point, and are most prone to metamerism failures. Colors in the second color gamut region have intermediate saturation, are located at intermediate distances to the white point, and are moderately prone to metamerism failures.

While these contours are illustrated with triangles in FIG. 3E, it should be noted that, in various embodiments, different shapes of contours and/or different numbers of contours and/or different ways of partitioning a color gamut may be used to generate or identify different color gamut regions.

In some embodiments, the image display or each pixel therein may be implemented to produce light for a to-be-rendered color denoted as C using three color primaries as set or controlled based on a color control function denoted as F( ) as follows:

$$C = F(f(w1, bw1), f(w2, bw2), f(w3, bw3)) \tag{2}$$

where $f(w\mathbf{1}, bw\mathbf{1})$ represents a first color primary generated with a first SPD comprising light of one or more first wavelength bands specified by one or more first representative wavelengths w1 and one or more first wavelength bands bw1; ƒ(w2, bw2) represents a second color primary generated with a second SPD comprising light of one or more second wavelength bands specified by one or more second representative wavelengths w2 and one or more second wavelength bands bw2; ƒ(w3, bw3) represents a third color primary generated with a third SPD comprising light of one or more third wavelength bands specified by one or more third representative wavelengths w3 and one or more third wavelength bands bw3.

A color gamut as described herein may be defined by more than three primaries to increase color volume or total numbers of colors supported by an image display as described herein. As illustrated in FIG. 3D, a color gamut formed by the four color primaries "R1", "G1", "B1" and "P" is larger than a color gamut formed by the three color primaries "R1", "G1" and "B1".

In some embodiments, the image display or each pixel therein may be implemented to produce light for a to-be-rendered color denoted as C using two, three, four or more color primaries as set or controlled based on a color control function denoted as NF( ) as follows:

$$C = NF(f(w1,\ bw1),\ f(w2,\ bw2),\ \ldots\ ) \tag{3}$$

In image rendering operations, as to-be-rendered colors are closer and closer to become the most saturated such as in the first color gamut region of FIG. 3E, one or more color primaries (e.g., in expression (2) or (3) above, etc.) used to render the colors can be changed to narrower and narrower wavelength bands.

In contrast, as to-be-rendered colors are closer and closer to become the least saturated such as in the third color gamut region of FIG. 3E, one or more color primaries (e.g., in expression (2) or (3) above, etc.) used to render the colors can be changed to broader and broader wavelength bands (each of which may comprise multiple narrow bands).

For to-be-rendered colors with intermediate saturation such as in the second color gamut region of FIG. 3E, one or more color primaries (e.g., in expression (2) or (3) above, etc.) used to render the colors can be changed to wavelength bands of intermediate bandwidths.

Under other approaches that do not implement techniques as described herein, an imag display may employ a subpixel type such a red subpixel type to express only a color primary corresponding to a color component/channel—red color component/channel in the present example—of a color space. Accordingly, a component pixel value—a red color component pixel value in the present example—of a pixel value to be rendered by a pixel is all what is needed to drive a corresponding subpixel or a corresponding red subpixel in the pixel.

In contrast, under techniques as described herein, other component pixel values of an (overall) pixel value to be rendered by a pixel may be used together with a component pixel value to drive a corresponding subpixel in the pixel to express a color primary represented by the component pixel value. For example, these other component values and the component pixel value may be used together to determine a location or saturation of a color represented by the (overall) pixel value. The location or the saturation of the color may be used to determine what bandwidth composition for the color primary represented by the component pixel value, thereby determining what digital control values to use to cause the bandwidth composition to be produced by the pixel for the color primary.

As previously noted, a color filter may be included in a unit structure as described herein to prevent ambient light from negatively impacting image rendering operations of the unit structure. The color filter may be designed to pass transmissive light that is used to render colors to a viewer.

In an example, a red (e.g., non-QD using red color pigment, etc.) color filter may be used with a unit structure comprising red QD materials. The red color filter may have a pass band that allows regenerated red light from the red QD materials to pass toward the viewer. In another example, a non-red color filter may be used with a QD color filter so long as the non-red color filter passes the regenerated light from the QD color filter. The non-red color filter may only filter out blue ambient light that may become a part of injected light capable of exciting or stimulating the red QD materials, thereby interfering with display operations of the red QD color filter.

Additionally, optionally or alternatively, a multi-band color filter may be used in a unit structure as described herein to allow only specific wavelengths of transmissive wavelength bands to pass through but block all other wavelengths.

In a unit structure that is designated to generate color white to combine or broaden color primaries, the color white may be generated with a mixture of different types of QD materials. A similar color filter configurations can be used for a white unit structure as described herein.

In some embodiments, light regeneration materials can be incorporated into a light valve layer, an optical stack, a backlight unit, a color filter, etc., for generating image rendering light and/or for recycling backlight in the blacklight unit, for illumination light on a light valve layer, a diffuser film, etc.

8. Example Process Flows

Figure 4:
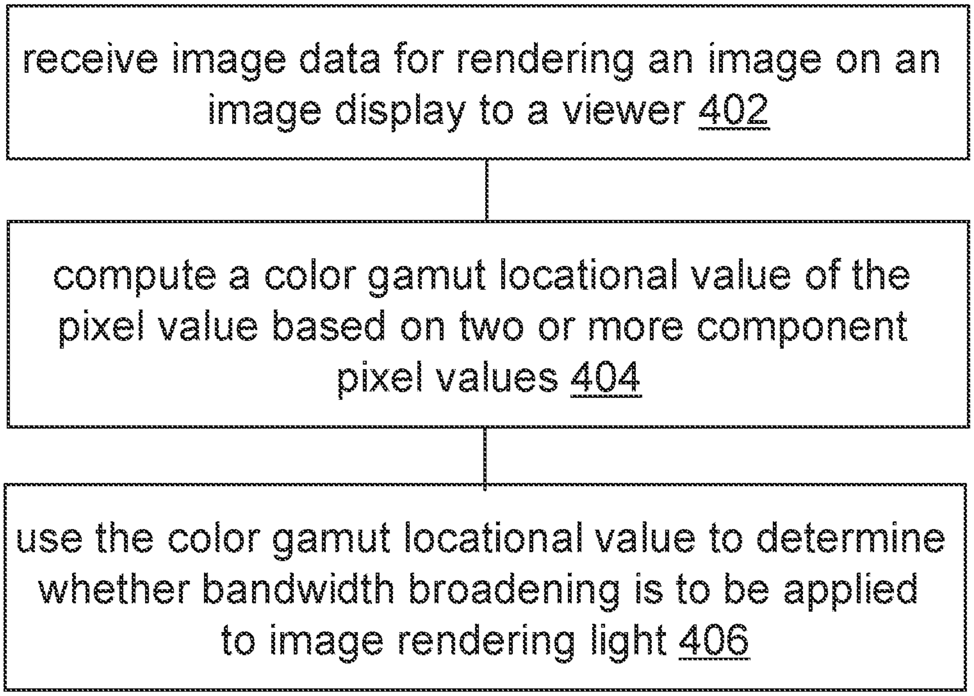
FIG. 4 illustrates an example process flow.

FIG. 4 illustrates an example process flow according to an embodiment. In some embodiments, one or more computing devices or components (e.g., an image rendering device, etc.) may perform this process flow. In block 402, an image processing system receives image data for rendering an image on an image display to a viewer, the image data specifying a pixel value of the image for a pixel of the image display to render, the pixel value for the pixel including multiple component pixel values corresponding to multiple color components of a color space.

In block 404, the image processing system computes a color gamut locational value of the pixel value based on two or more component pixel values in the multiple component pixel values of the pixel value specified for the pixel.

In block 406, the image processing system uses the color gamut locational value to determine whether bandwidth broadening is to be applied to image rendering light produced by the pixel of the image display to render the pixel value, the image rendering light being directed to the viewer.

In an embodiment, the image rendering light comprises light from one or more of: quantum dots, remote phosphor materials, luminescent materials, laser light sources, light-emitting diodes (LEDs), organic LEDs, cold cathode fluorescent lights (CCFLs), etc.

In an embodiment, the pixel comprises three or more subpixels; at least one subpixel in the three or more subpixels is digitally driven to generate a portion of the image rendering light in an additional wavelength band in response to determining that bandwidth broadening is to be applied to the image rendering light.

In an embodiment, the pixel comprises three or more subpixels; at least one subpixel in the three or more subpixels is digitally driven not to generate a portion of the image rendering light in an additional wavelength band in response to determining that bandwidth broadening is not to be applied to the image rendering light.

In an embodiment, the pixel comprises three or more subpixels; the three or more subpixels are configured to be digitally driven to produce light of three or more color primaries that define a color gamut; the color gamut includes all colors supported by the pixel; the light of three or more color primaries without bandwidth broadening renders each of the three or more color primaries in a narrow wavelength band.

In an embodiment, the pixel comprises a unit structure for producing at least a portion of the image rendering light; the unit structure represents: one of: a subpixel with a light regeneration color filter free of a non-light-regeneration color filter, a subpixel with a light regeneration color filter in addition to a non-light-regeneration color filter, a subpixel without a color filter, a subpixel with a light valve layer portion on which a light regeneration layer portion is disposed, a subpixel with an optical stack on which a light regeneration layer portion is disposed in a backlight unit, a subpixel without light regeneration materials, a subpixel with organic light emitting diodes (organic LEDs), a subpixel with micro-LEDs, a subpixel with a single light valve layer portion belonging to a single light valve layer, or a subpixel with multiple light valve layer portions belonging to multiple light valve layers, a subpixel with one or more liquid crystal layer portions belonging to one or more liquid crystal layers, a subpixel with a light diffuser, a subpixel with a finish polarizer, a subpixel with an in-cell polarizer, a subpixel with a side-lit light source, a subpixel with a back-lit light source, and so on.

In an embodiment, the pixel comprises three or more color primary subpixels configured to be digitally driven to produce light of three or more color primaries in three or more narrow wavelength bands, respectively; the pixel comprises at least one additional subpixels configured to be digitally driven to produce light of a wavelength band adjacent to at least one of the three or more narrow wavelength bands.

In an embodiment, the pixel comprises three or more subpixels; at least one subpixel in the three or more subpixels is configured to be digitally driven to produce light of a color primary in a narrow wavelength bands and is configured to be separately digitally driven to produce light of a wavelength band adjacent to the narrow wavelength band.

In an embodiment, the pixel comprises three or more color primary subpixels configured to be digitally driven to produce light of three or more color primaries in three or more narrow wavelength bands, respectively; the pixel comprises at least one additional subpixels configured to be digitally driven to produce white light.

In an embodiment, the image display includes a group of neighboring pixels to which the pixel belongs; each pixel in the group of neighboring pixels produce light of color primaries each of which is a color primary in a narrow wavelength band; the group of neighboring pixels shares one or more unit structures that are configured to be digitally driven to generate light of wavelength bands adjacent to narrow wavelength bands in the light of color primaries.

In an embodiment, the bandwidth widening depends at least in part on color saturation as represented in the color gamut locational value.

In an embodiment, the color space represents one of: a RGB color space, a YCbCr color space, an IPT color space, an ICtCp color space, another color space, etc.

In an embodiment, a display system comprises: an image display; a display control logic implemented at least in part by one or more computer processors to control image rendering operations in connection with the image display. The display control logic is configured to perform the method as recited in any of the foregoing methods or process flows.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

9. Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the disclosure. For example, one or more processors in a display, an encoder, a set top box, a transcoder or the like may implement methods related to adaptive perceptual quantization of HDR images as described above by executing software instructions in a program memory accessible to the processors. Embodiments of the invention may also be provided in the form of a program product. The program product may comprise any non-transitory medium which carries a set of computer-readable signals comprising instructions which, when executed by a data processor, cause the data processor to execute a method of an embodiment of the invention. Program products according to embodiments of the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
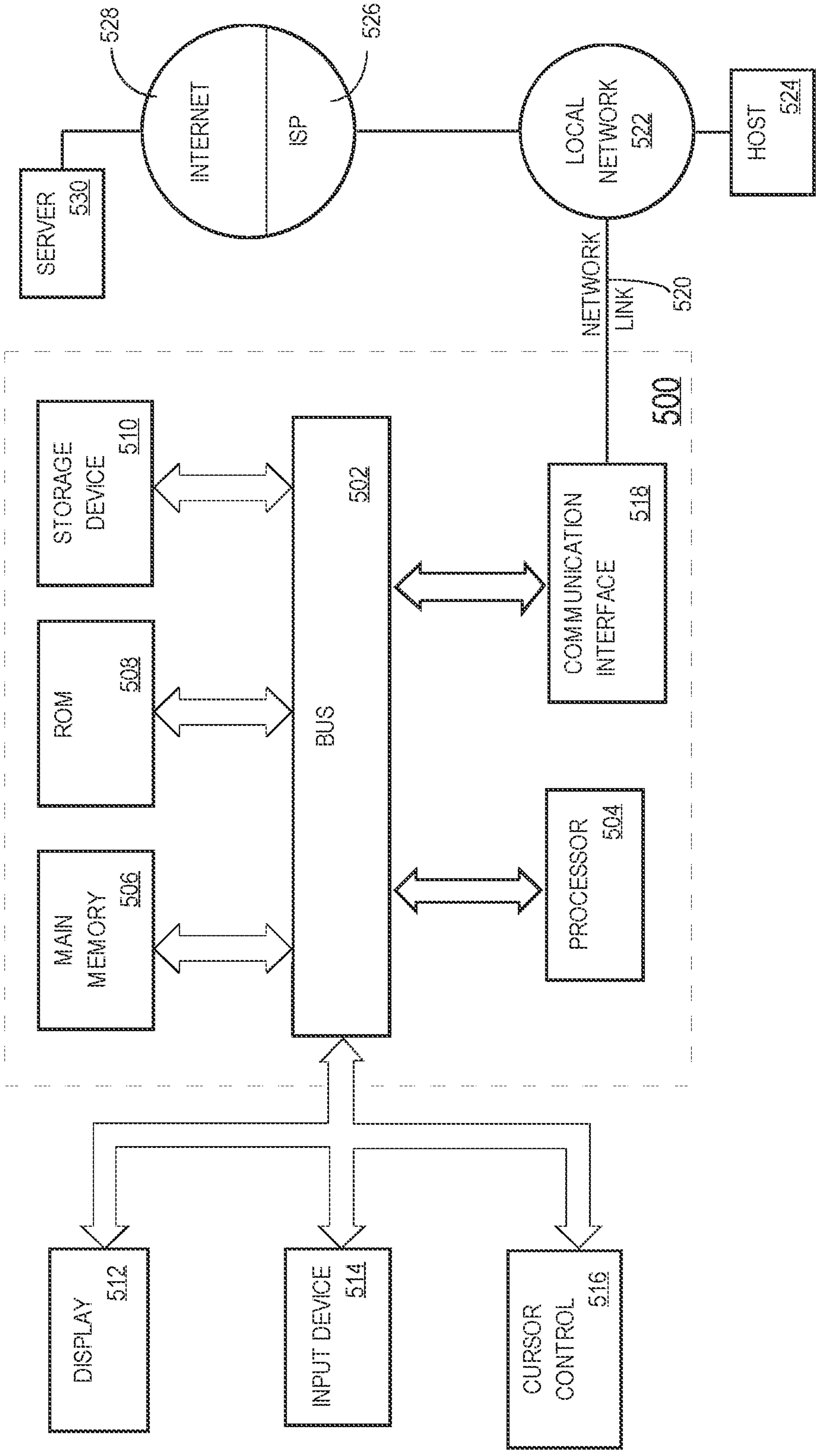
FIG. 5 illustrates an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

10. Equivalents, Extensions, Alternatives and Miscellaneous

In the foregoing specification, embodiments of the invention have been described with reference to numerous specific details that may vary from implementation to implementation. Thus, the sole and exclusive indicator of what is claimed embodiments of the invention, and is intended by the applicants to be claimed embodiments of the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense. Various aspects and implementations of the present disclosure may also be appreciated from the following enumerated example embodiments (EEEs), which are not claims.

EEE1. A method, comprising:

receiving image data for rendering an image on an image display to a viewer, the image data specifying a pixel value of the image for a pixel of the image display to render, the pixel value for the pixel including multiple component pixel values corresponding to multiple color components of a color space; computing a color gamut locational value of the pixel value based on two or more component pixel values in the multiple component pixel values of the pixel value specified for the pixel; and using the color gamut locational value to determine whether bandwidth broadening is to be applied to image rendering light produced by the pixel of the image display to render the pixel value, the image rendering light being directed to the viewer.

EEE2. The method of EEE 1, wherein the image rendering light comprises light from one or more of: quantum dots, remote phosphor materials, luminescent materials, laser light sources, light-emitting diodes (LEDs), organic LEDs, or cold cathode fluorescent lights (CCFLs).

EEE3. The method of any of EEE 1 or 2, wherein the pixel comprises three or more subpixels; wherein at least one subpixel in the three or more subpixels is digitally driven to generate a portion of the image rendering light in an additional wavelength band in response to determining that bandwidth broadening is to be applied to the image rendering light.

EEE4. The method of any of EEEs 1-3, wherein the pixel comprises three or more subpixels; wherein at least one subpixel in the three or more subpixels is digitally driven not to generate a portion of the image rendering light in an additional wavelength band in response to determining that bandwidth broadening is not to be applied to the image rendering light.

EEE5. The method of any of EEEs 1-4, wherein the pixel comprises three or more subpixels; wherein the three or more subpixels are configured to be digitally driven to produce light of three or more color primaries that define a color gamut; wherein the color gamut includes all colors supported by the pixel; wherein the light of three or more color primaries without bandwidth broadening renders each of the three or more color primaries in a narrow wavelength band.

EEE6. The method of any of EEEs 1-5, wherein the pixel comprises a unit structure for producing at least a portion of the image rendering light; wherein the unit structure represents: one of: a subpixel with a light regeneration color filter free of a non-light-regeneration color filter, a subpixel with a light regeneration color filter in addition to a non-light-regeneration color filter, a subpixel without a color filter, a subpixel with a light valve layer portion on which a light regeneration layer portion is disposed, a subpixel with an optical stack on which a light regeneration layer portion is disposed in a backlight unit, a subpixel without light regeneration materials, a subpixel with organic light emitting diodes (organic LEDs), a subpixel with micro-LEDs, a subpixel with a single light valve layer portion belonging to a single light valve layer, or a subpixel with multiple light valve layer portions belonging to multiple light valve layers, a subpixel with one or more liquid crystal layer portions belonging to one or more liquid crystal layers, a subpixel with a light diffuser, a subpixel with a finish polarizer, a subpixel with an in-cell polarizer, a subpixel with a side-lit light source, or a subpixel with a back-lit light source.

EEE7. The method of any of EEEs 1-6, wherein the pixel comprises three or more color primary subpixels configured to be digitally driven to produce light of three or more color primaries in three or more narrow wavelength bands, respectively; wherein the pixel comprises at least one additional subpixels configured to be digitally driven to produce light of a wavelength band adjacent to at least one of the three or more narrow wavelength bands.

EEE8. The method of any of EEEs 1-7, wherein the pixel comprises three or more subpixels; wherein at least one subpixel in the three or more subpixels is configured to be digitally driven to produce light of a color primary in a narrow wavelength bands and is configured to be separately digitally driven to produce light of a wavelength band adjacent to the narrow wavelength band.

EEE9. The method of any of EEEs 1-8, wherein the pixel comprises three or more color primary subpixels configured to be digitally driven to produce light of three or more color primaries in three or more narrow wavelength bands, respectively; wherein the pixel comprises at least one additional subpixels configured to be digitally driven to produce white light.

EEE10. The method of any of EEEs 1-9, wherein the image display includes a group of neighboring pixels to which the pixel belongs; wherein each pixel in the group of neighboring pixels produce light of color primaries each of which is a color primary in a narrow wavelength band; wherein the group of neighboring pixels shares one or more unit structures that are configured to be digitally driven to generate light of wavelength bands adjacent to narrow wavelength bands in the light of color primaries.

EEE11. The method of any of EEEs 1-10, wherein the bandwidth widening depends at least in part on color saturation as represented in the color gamut locational value.

EEE12. The method of any of EEEs 1-11, wherein the color space represents one of: a RGB color space, a YCbCr color space, an IPT color space, an ICtCp color space, or another color space.

EEE13. A display system, comprising:

an image display;

a display control logic implemented at least in part by one or more computer processors to control image rendering operations in connection with the image display;

wherein the display control logic is configured to perform the method as recited in any of EEEs 1-12.

EEE14. A non-tangible computer readable storage medium, storing software instructions, which when executed by one or more computer processors cause performance of the methods recited in any of EEEs 1-12.

EEE15. An apparatus comprising one or more computer processors and one or more storage media storing a set of instructions which, when executed by the one or more computer processors, cause performance of the method recited in any of EEEs 1-12.

The invention claimed is:

1. A method, comprising:

receiving image data for rendering an image on an image display to a viewer, the image display comprising an array of pixels arranged in a spatial pattern, the image data specifying a pixel value of the image for a pixel of the image display to render, the pixel value for the pixel including multiple component pixel values corresponding to multiple color components of a color space;

computing a color gamut locational value of the pixel value based on two or more component pixel values in the multiple component pixel values of the pixel value specified for the pixel; and using the color gamut locational value to determine a distance between a color represented by the pixel value and a white point in the color space;

based at least in part on the distance between the color and the white point, determining whether bandwidth broadening is to be applied to image rendering light produced by the pixel of the image display to render the pixel value such that metamerism failures are prevented or reduced, the image rendering light being directed to the viewer to render the image to the viewer.

2. The method of claim 1, wherein the image rendering light comprises light from one or more of: quantum dots, remote phosphor materials, luminescent materials, laser light sources, light-emitting diodes (LEDs), organic LEDs, or cold cathode fluorescent lights (CCFLs).

3. The method of claim 1, wherein the pixel comprises three or more subpixels; wherein at least one subpixel in the three or more subpixels is digitally driven to generate a portion of the image rendering light in an additional wavelength band in response to determining that bandwidth broadening is to be applied to the image rendering light.

4. The method of claim 3, wherein the bandwidth broadening includes superimposing the portions of the image rendering light produced by the three or more subpixels to form a mixture or stack of image rendering light of different wavelength bands.

5. The method of claim 1, wherein the pixel comprises three or more subpixels; wherein at least one subpixel in the three or more subpixels is digitally driven not to generate a portion of the image rendering light in an additional wavelength band in response to determining that bandwidth broadening is not to be applied to the image rendering light.

6. The method of claim 1, wherein the pixel comprises three or more subpixels; wherein the three or more subpixels are configured to be digitally driven to produce light of three or more color primaries that define a color gamut; wherein the color gamut includes all colors supported by the pixel; wherein the light of three or more color primaries without bandwidth broadening renders each of the three or more color primaries in a narrow wavelength band.

7. The method of any of claim 1, wherein the pixel comprises a unit structure for producing at least a portion of the image rendering light; wherein the unit structure represents: one of: a subpixel with a light regeneration color filter free of a non-light-regeneration color filter, a subpixel with a light regeneration color filter in addition to a non-light-regeneration color filter, a subpixel without a color filter, a subpixel with a light valve layer portion on which a light regeneration layer portion is disposed, a subpixel with an optical stack on which a light regeneration layer portion is disposed in a backlight unit, a subpixel without light regeneration materials, a subpixel with organic light emitting diodes (organic LEDs), a subpixel with micro-LEDs, a subpixel with a single light valve layer portion belonging to a single light valve layer, or a subpixel with multiple light valve layer portions belonging to multiple light valve layers, a subpixel with one or more liquid crystal layer portions belonging to one or more liquid crystal layers, a subpixel with a light diffuser, a subpixel with a finish polarizer, a subpixel with an in-cell polarizer, a subpixel with a side-lit light source, or a subpixel with a back-lit light source.

8. The method of claim 1, wherein the pixel comprises three or more color primary subpixels configured to be digitally driven to produce light of three or more color primaries in three or more narrow wavelength bands, respectively; wherein the pixel comprises at least one additional subpixel configured to be digitally driven to produce light of a wavelength band adjacent to at least one of the three or more narrow wavelength bands.

9. The method of claim 1, wherein the pixel comprises three or more subpixels; wherein at least one subpixel in the three or more subpixels is configured to be digitally driven to produce light of a color primary in a narrow wavelength band and is configured to be separately digitally driven to produce light of a wavelength band adjacent to the narrow wavelength band.

10. The method of claim 1, wherein the pixel comprises three or more color primary subpixels configured to be digitally driven to produce light of three or more color primaries in three or more narrow wavelength bands, respectively; wherein the pixel comprises at least one additional subpixels configured to be digitally driven to produce white light.

11. The method of any of claim 1, wherein the image display includes a group of neighboring pixels to which the pixel belongs; wherein each pixel in the group of neighboring pixels produces light of color primaries each of which is a color primary in a narrow wavelength band; wherein the group of neighboring pixels shares one or more unit structures that are configured to be digitally driven to generate light of wavelength bands adjacent to narrow wavelength bands in the light of color primaries.

12. The method of claim 1, wherein the bandwidth broadening depends at least in part on color saturation as represented in the color gamut locational value.

13. The method of claim 12, wherein the color saturation is determined using a combination of the component pixel values in the pixel value to search a saturation value lookup table indexed with different unique combinations of component pixel values of different possible pixel values.

14. The method of claim 1, wherein the color space represents one of:

a RGB color space, a YCbCr color space, an IPT color space, an ICtCp color space, or another color space.

15. The method of any of claim 1 further including deriving the image from the image data and rendering the image on the image display using the image rendering light.

16. A display system, comprising:

an image display;

a display control logic implemented at least in part by one or more computer processors to control image rendering operations in connection with the image display;

wherein the display control logic is configured to perform the method as recited in claim 1.

17. A non-tangible computer readable storage medium, storing software instructions, which when executed by one or more computer processors cause performance of the methods recited in claim 1.

18. An apparatus comprising one or more computer processors and one or more storage media storing a set of instructions which, when executed by the one or more computer processors, cause performance of the method recited in claim 1.

* * * * *